UNITED STATES PATENT OFFICE.

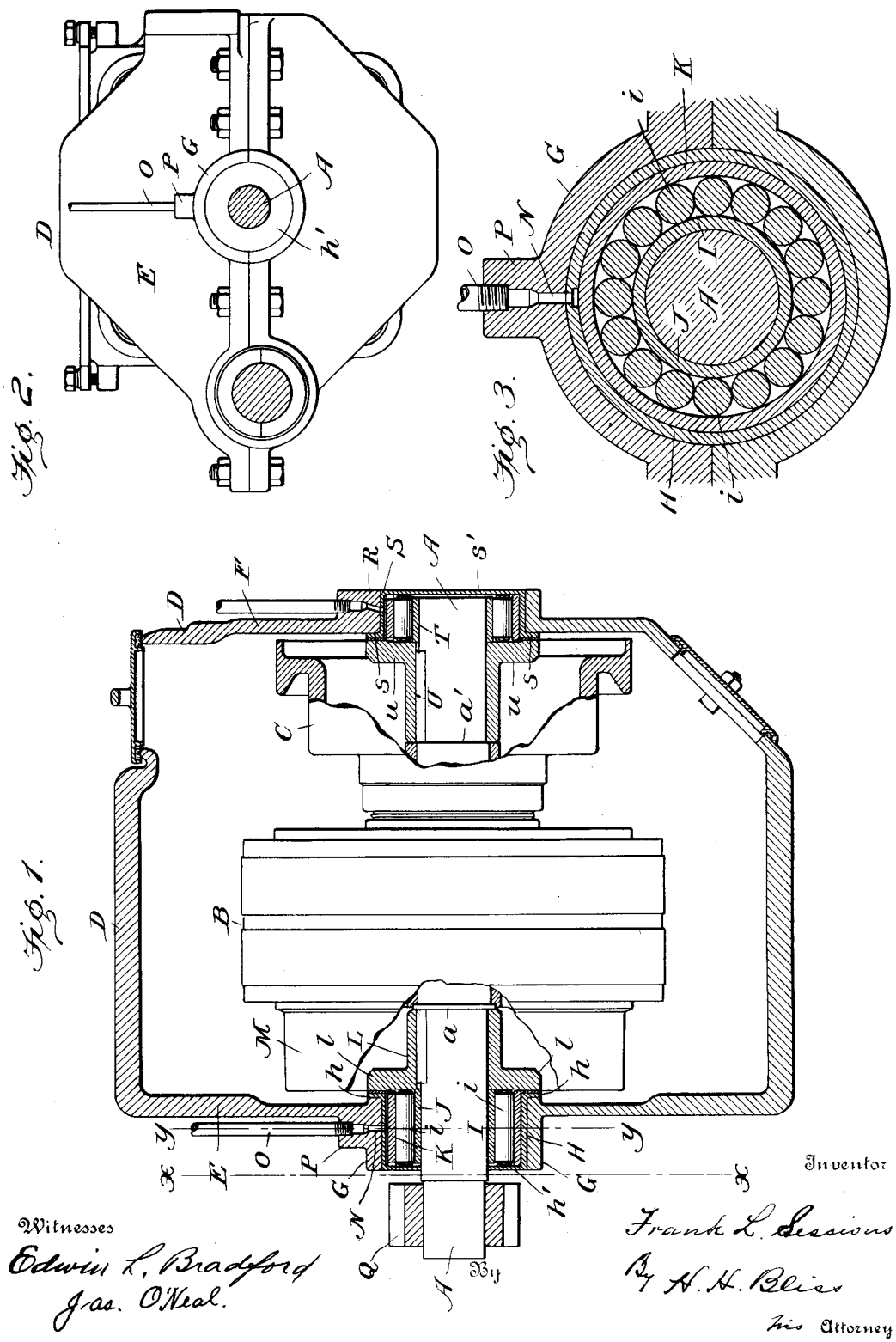

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

ELECTRIC MOTOR.

1,130,547.      Specification of Letters Patent.      Patented Mar. 2, 1915.

Application filed August 16, 1906, Serial No. 330,874. Renewed July 18, 1914. Serial No. 851,814.

*To all whom it may concern:*

Be it known that I, FRANK L. SESSIONS, a citizen of the United States, residing at Columbus, in the county of Franklin and State of Ohio, have invented certain new and useful Improvements in Electric Motors, of which the following is a specification, reference being had therein to the accompanying drawing.

This invention relates to improvements in electric motors.

One of the ends aimed at in the construction about to be described is to provide bearings for the armature shaft which shall occupy much less room longitudinally of the shaft than has been required in motors of the same size and capacity as heretofore constructed.

Another object is to so construct relatively short bearings for the armature, that the difficulties shall be overcome which are incident to the vibrations of the armature in its boxes and to its tendency to wear unevenly; in short, to hold it true from end to end, and have it impeded in its rotation by a minimum of friction.

In the drawings—Figure 1 is a vertical section of so much of a motor as is sufficient to illustrate the manner of constructing the same with my improvements. Fig. 2 is a section on the line $x, x$. Fig. 3 is a section on the line $y, y$, of Fig. 1.

While a sufficient portion of an electric motor is shown in the drawings to illustrate one of the forms to which my invention can be applied, it is to be understood that it is not limited in this respect, as there are many details which can be varied without departing from the spirit of the invention.

In the drawings, A indicates the armature shaft as a whole, B the armature, C the commutator, and D the field magnet. Inasmuch as these can be varied, or can be of any desired sort, it is not necessary that the details of the construction should be fully described.

The field magnet, proper, is formed with end wall parts E, F, these together with the peripheral part of the field constituting an inclosing box. As an entirety it is divisible on a plane passing through the shaft so that the upper part of the field or the lower part can be removed when it is desired to get access to the interior part. The shaft A rests in the end walls E and F, the following parts being interposed between them. At G a short bearing sleeve is provided, it being preferably formed in halves, one cast with the upper part and the other with the lower part of the end wall E. H is a bushing or sleeve fitted in this bearing G, it having a flange at $h$ on the inside of the wall E, and a flange or closing plate $h'$ at its outer end. Between the shaft A and the bearing G and bushing H a roller bearing is interposed, indicated as a whole by I. J is a sleeve or long collar fitted to the shaft A and adapted to take the thrust and wear from the roller bearing. K is a wearing sleeve fitted to the inside of the bushing H.

$i, i$ are the rollers, and these may be constructed and mounted in any well known way.

L indicates a strong abutting collar keyed or rigidly secured to the shaft A and situated immediately inside the inner ends of the rollers of the bearing. It extends radially to the edge of the flange $h$ of the bushing H, and serves to prevent any movement, outward or inward, either of the shaft itself or of the bearing at G. At its inner end it bears against a strong flange $a$ formed on the shaft A.

The plane of separation between the inner end of the bearing sleeve G and the flange $h$ of bushing H is in or just outside of the vertical plane of the outermost rotary part of the armature, such for instance as the coil supporting cylinder at M. Consequently, when it is desired to lift the upper half of the field, the upper part of the bearing can be separated from the lower part and the whole can be lifted directly upward without one part interfering with the other. By extending the flange part $l$ of the stop collar L well outward, radially, its efficiency is increased in holding the shaft and the part carried thereby steadily in position when they are rotating.

The interior of the roller bearing chamber can be thoroughly lubricated through the duct N with which connects the oil pipe O threaded at its lower end in a socket at P.

Power is taken from the armature shaft through the pinion Q. It will be seen that the length of the bearing, measured longitudinally of the armature shaft, is much less than is the length of the bearings ordinarily employed in electric motors at the pinion ends of the shafts, account being taken of the given size and power of the motor. Consequently, the pinion can be brought close up to the rotary parts of the armature, the power can be applied more directly, and the resistance in the bearings can be greatly reduced, and at the same time the shortness of the support is compensated for by the anti-friction rollers of large diameter and the abutting and bracing collar L. At the other end of the shaft a roller bearing is provided, substantially similar in construction to that above described, but much shorter in the line of direction of the shaft, because of there being much less train at this end than at the end which carries the power transmitting pinion. The end wall F has a thickened bearing part at R into which is fitted the bushing or lining cap S formed with the flange $s$ lying on the inside of the wall, and with the closing plate $s'$, which in this case extends clear across the shaft opening.

T is a bearing sleeve secured to the end of the shaft and T' a bearing sleeve inserted into the bushing S.

U is an abutment, rigidly secured to the shaft A and having its inner end bearing against a shoulder $a'$ on the shaft. The radially extending flange $u$ extends upward far enough to get a firm bearing against the end wall F. The parts at this end of the shaft are so constructed and related that the plane of separation between the inner surface of the wall F and the flange $s$ shall be in such position that the upper part of the field magnet can be lifted or removed without interfering with any of the parts of the armature or commutator.

A motor having shaft mountings of the character described can be so designed as to develop great power, and yet have all of its parts in a compact space, permitting it to be utilized at places where but little room is available, as for instance on car trucks, particularly such as are used in mines and tunnels. And the disadvantages incident to shortening the bearings at the ends of the shaft are fully compensated by the matters which I have described.

What I claim is:—

1. In an electric motor of the inclosed box type, the combination of the armature, the field magnet having the end walls in transverse planes close to the ends of the rotary parts of the armature, the armature shaft passing through the said end walls, the bearing chambers in the end walls, the bearing rollers in said chambers between the shaft and the end walls, and the abutment collar rotating with the shaft and bearing against the end wall outside of the rollers, the outer face of said collar being approximately in line with the end of the armature and the end walls of the field being adapted to be lifted away from the abutment collar without impinging upon the rotary parts of the armature, substantially as set forth.

2. In an electric motor of the inclosed box type, the combination of the armature, the field magnet having the end walls in transverse planes close to the ends of the rotary parts of the armature, the armature shaft passing through the said end walls, the bearing rollers between the shaft and the end walls, and the rotary stops or abutments L, U, abutting inward against the shaft and outward against the end walls, each of said abutments having its outer face approximately in line with the adjacent end of the armature, substantially as set forth.

3. In an electric motor of the inclosed box type, the combination of the armature, the field magnet having the end walls in transverse planes close to the ends of the rotary parts of the armature, the armature shaft passing through the said end walls, the bearing rollers between the shaft and the end walls, the bushings inserted into the apertures in the end walls, and having plates transverse to the shaft extending across the outer ends of the roller chambers, and stop devices rotating with the shaft closing the inner ends of the roller chambers and bearing against the end walls, each of said stop devices having its outer face approximately in line with the adjacent end of the armature, substantially as set forth.

In testimony whereof I affix my signature, in presence of two witnesses.

FRANK L. SESSIONS.

Witnesses:
  E. P. SNIVELY,
  C. L. McCONKEY.